(12) United States Patent
Cui et al.

(10) Patent No.: US 9,135,342 B2
(45) Date of Patent: Sep. 15, 2015

(54) COMPREHENSIVE, RELEVANT, AND DYNAMIC DATA SEARCHING IN A VIRTUALIZATION ENVIRONMENT

(75) Inventors: Liang Cui, Beijing (CN); Hailing Xu, Peking (CN); Ying He, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 592 days.

(21) Appl. No.: 12/783,621

(22) Filed: May 20, 2010

(65) Prior Publication Data

US 2011/0213765 A1    Sep. 1, 2011

(30) Foreign Application Priority Data

Feb. 26, 2010 (CN) .......................... 2010 1 0114852

(51) Int. Cl.
*G06F 7/00* (2006.01)
*G06F 17/30* (2006.01)
(52) U.S. Cl.
CPC .... *G06F 17/30864* (2013.01); *G06F 17/30312* (2013.01)
(58) Field of Classification Search
CPC .................. G06F 9/45558; G06F 2009/45562; G06F 2201/815; G06F 11/1458
USPC ......... 707/639, 649, 707, 711, 715, 741, 830, 707/673, 831; 711/6; 717/148; 718/1
See application file for complete search history.

(56) References Cited

U.S. PATENT DOCUMENTS

| | | | |
|---|---|---|---|
| 7,213,246 B1 * | 5/2007 | van Rietschote et al. ......... 718/1 |
| 8,046,534 B2 * | 10/2011 | Xu et al. ...................... 711/114 |
| 8,528,059 B1 * | 9/2013 | Labana et al. .................... 726/5 |
| 2006/0101116 A1 * | 5/2006 | Rittman et al. ............... 709/204 |
| 2007/0112999 A1 * | 5/2007 | Oney et al. ....................... 711/6 |
| 2007/0130305 A1 * | 6/2007 | Piper et al. .................... 709/223 |
| 2007/0186025 A1 * | 8/2007 | Boyd et al. .................... 710/305 |
| 2008/0010487 A1 * | 1/2008 | Dekel et al. ...................... 714/4 |
| 2008/0134175 A1 * | 6/2008 | Fitzgerald et al. ................ 718/1 |
| 2008/0134176 A1 * | 6/2008 | Fitzgerald et al. ................ 718/1 |
| 2008/0134177 A1 * | 6/2008 | Fitzgerald et al. ................ 718/1 |
| 2008/0134178 A1 * | 6/2008 | Fitzgerald et al. ................ 718/1 |
| 2008/0184225 A1 * | 7/2008 | Fitzgerald et al. ................ 718/1 |
| 2009/0007105 A1 * | 1/2009 | Fries et al. ....................... 718/1 |
| 2010/0023565 A1 * | 1/2010 | Colbert et al. ................ 707/204 |
| 2010/0070448 A1 * | 3/2010 | Omoigui ......................... 706/47 |
| 2010/0070725 A1 * | 3/2010 | Prahlad et al. ................ 711/162 |
| 2010/0235831 A1 * | 9/2010 | Dittmer ........................... 718/1 |
| 2010/0257523 A1 * | 10/2010 | Frank ............................. 718/1 |
| 2010/0306773 A1 * | 12/2010 | Lee et al. ......................... 718/1 |
| 2011/0004708 A1 * | 1/2011 | Kondo et al. .................. 710/38 |
| 2011/0126197 A1 * | 5/2011 | Larsen et al. .................... 718/1 |
| 2011/0145199 A1 * | 6/2011 | Prasad Palagummi ....... 707/654 |

* cited by examiner

*Primary Examiner* — Mariela Reyes
*Assistant Examiner* — Linh Black

(57) ABSTRACT

A method includes indexing data and/or metadata in online virtual machines (VMs), offline VMs, virtual applications, and/or snapshots thereof on one or more host server(s) in a virtualization environment through a search architecture in the virtualization environment. The online VMs are VMs that are powered on, and the offline VMs are VMs that are powered off. The method also includes maintaining a database of the indexed data and/or metadata in the online VMs, the offline VMs, the virtual applications, and/or the snapshots thereof to enable a comprehensive search result to a search query through the search architecture. The database is associated with the search architecture.

21 Claims, 13 Drawing Sheets

| SEARCH REQUEST PARAMETER 1002 | TYPE 1004 |
|---|---|
| SESSION ID | STRING |
| QUERY | STRING |
| START | INT |
| MAXRESULTS | INT |
| TYPE | INT |
| LOCATION | STRING |

FIGURE 10

| RESULT STRUCTURE PARAMETERS 1102 | TYPE 1104 |
|---|---|
| TOTALRESULTSCOUNT | INT |
| RESULTELEMENTS | ARRAY |
| STARTINDEX | INT |
| ENDINDEX | INT |

FIGURE 11

| RESULT ENTRY STRUCTURE PARAMETERS 1202 | TYPE 1204 |
|---|---|
| NAME | STRING |
| TYPE | INT |
| PATH | STRING |
| SNIPPET | STRING |
| LASTMODIFIEDTIME | DATETIME |

FIGURE 12

| QUERY CAPABILITY 1302 | EXAMPLE QUERY 1304 |
|---|---|
| DEFAULT SEARCH | A B |
| INCLUDE SEARCH | A +B |
| EXCLUDE SEARCH | A -B |
| PHRASE SEARCH | "HOST SERVER" |
| BOOLEAN SEARCH | A OR B |
| LOCATION SEARCH | LOCATION:[DATACENTER][HOST SERVER][VM] |
| CONTENT SEARCH | CONTENT:CLOUD OS |
| TITLE SEARCH | TITLE:CLOUD OS |

FIGURE 13

COMPREHENSIVE, RELEVANT, AND DYNAMIC DATA SEARCHING IN A VIRTUALIZATION ENVIRONMENT

CROSS REFERENCE TO RELATED APPLICATIONS

This Application claims foreign priority benefits under 35 U.S.C. 119 of Chinese Patent Application 201010114852.5, which was filed on Feb. 26, 2010.

BACKGROUND

Commercial search engines (e.g., Google®, Yahoo®) serve as windows to the world of information, and are utilized by people to obtain useful information of interest through searches performed therein. In the virtualization environment including virtual machines (VMs), a user may have to manage a large number of VMs and snapshots. When the user desires to find data inside a VM, it is highly likely that he/she may not recall the VM corresponding to the data. Therefore, the user may have to power ON every possible VM to check contents therein, which lends to an undesirable experience.

SUMMARY

In one aspect, a method includes indexing data and/or metadata in online virtual machines (VMs), offline VMs, virtual applications, and/or snapshots thereof on one or more host server(s) in a virtualization environment through a search architecture in the virtualization environment. The online VMs are VMs that are powered on, and the offline VMs are VMs that are powered off.

The method also includes maintaining a database of the indexed data and/or metadata in the online VMs, the offline VMs, the virtual applications, and/or the snapshots thereof to enable a comprehensive search result to a search query through the search architecture. The database is associated with the search architecture.

In another aspect, a method includes indexing data and/or metadata in online VMs, offline VMs, virtual applications, and/or snapshots thereof on one or more host server(s) in a virtualization environment through a search architecture in the virtualization environment. The online VMs are VMs that are powered on, and the offline VMs are VMs that are powered off.

The method also includes updating the indexed data and/or metadata in the online VMs, the offline VMs, the virtual applications, and/or the snapshots thereof based on a state change therein through the search architecture in the virtualization environment to enable a relevant and a dynamic search result to a search query through the search architecture.

In yet another aspect, a virtualization environment includes one or more host server(s) that include an online VM, an offline VM, a virtual application, and/or snapshots thereof. The virtualization environment also includes a search architecture configured to enable indexing of the data and/or the metadata in the online VM, the offline VM, the virtual application, and/or snapshots thereof.

The online VM is a VM that is powered on, the offline VM is a VM that is powered off, and the search architecture includes a database of the indexed data and/or metadata in the online VM, the offline VM, the virtual application, and/or the snapshots thereof configured to enable a comprehensive search result to a search query through the search architecture.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

FIG. 10 is a table of search request parameters, according to one or more embodiments.

FIG. 11 is a table of result structure parameters, according to one or more embodiments.

FIG. 12 is a table of result entry structure parameters, according to one or more embodiments.

FIG. 13 is a table of extensible query syntax and examples, according to one or more embodiments.

DETAILED DESCRIPTION

Example embodiments, as described below, may be used to realize comprehensive, dynamic, and relevant data searching in a virtualization environment. Although the present embodiments have been described with reference to specific example embodiments, it will be evident that various modifications and changes may be made to these embodiments without departing from the broader spirit and scope of the various embodiments.

Figure 1:
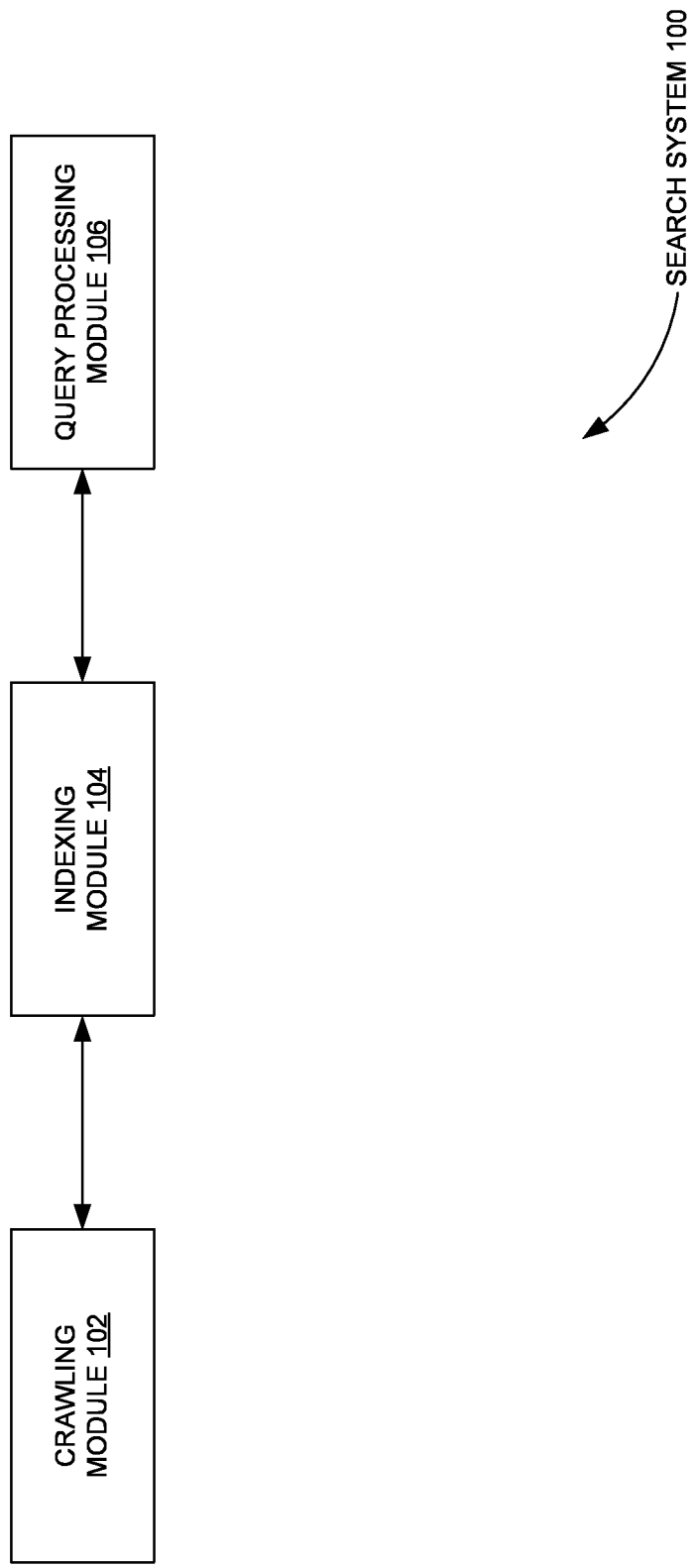
FIG. 1 is a schematic view of a search system, according to one or more embodiments.

FIG. 1 shows a search system 100, according to one or more embodiments. In one or more embodiments, search system 100 may include a crawling module 102 configured to obtain (e.g., download, grab, collect) relevant data from sources across a virtualization environment (VE). In one or more embodiments, the sources across a VE may include virtual machines (VMs), virtual applications (vApps), host servers, databases, and/or catalogs. In one or more embodiments, crawling module 102 may be distributed and efficient with respect to network usage. A vApp is a container that can contain one or more VMs. A vApp can power on and power off, and can also be cloned.

In one or more embodiments, search system 100 may also include an indexing module 104 interfaced with crawling module 102. In one or more embodiments, indexing module 104 may be responsible for partitioning and indexing the crawled data. In one or more embodiments, indexing module 104 may serve to build an Information Retrieval (IR) system through the partitioning and indexing of the crawled data.

In one or more embodiments, search system 100 may further include a query processing module 106 interfaced with the indexing module 104. In one or more embodiments, query processing module 106 may be configured to scalably process incoming queries and to maintain reasonable response time, availability, and quality of results.

In one or more embodiments, search system 100, therefore, may need to be scalable to process increasing workloads as more resources are added to the VE. In one or more embodiments, crawling module 102, indexing module 104, and query processing module 106 may serve as system modules in a VE. In one or more embodiments, search system 100 may be implemented based on a virtualization platform or a cloud computing platform that provides the ability to view the infrastructure as well as utilize the services provided therein. The term cloud computing environment, as used herein, means a set of interconnected computers, including virtual machines, that are managed by a special software, which is typically called a cloud operating system (Cloud OS). The Could OS hides the underlying technology infrastructure details from users or clients. Users typically interact with the could computing environment through a set of services that are exposed by the cloud computing environment.

In one or more embodiments, query processing module 106 may process queries in a distributed fashion. In one or more embodiments, users may be provided an assurance that applications can be managed, moved, and/or operated in the cloud computing environment analogous to an on-site operation. In one or more embodiments, data in a cloud computing initiative catalog that may be of interest to users include but is not limited to virtual application (vApp) information, templates, and premium media files. In one or more embodiments, in addition, users in the cloud environment may have individual visible scopes. For example, a cloud environment administrator may search all catalogs and inventory information, but an organization administrator may be restricted to the organization he/she belongs to.

Figure 2:
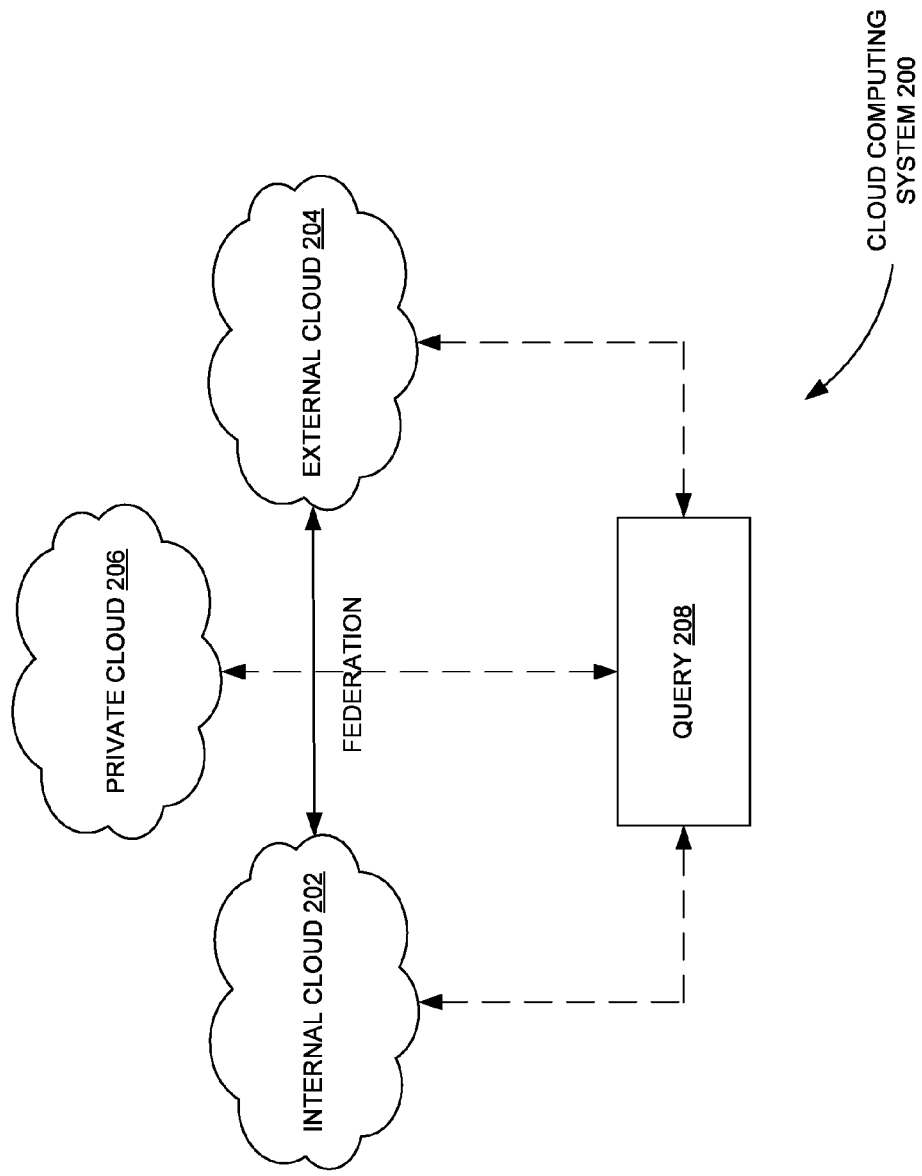
FIG. 2 is a schematic view of searching in a cloud computing system including an internal cloud and an external cloud, according to one or more embodiments.

FIG. 2 illustrates searching in a cloud computing system 200 including an internal cloud 202 and an external cloud 204, according to one or more embodiments. In one or more embodiments, internal cloud 202 and external cloud 204 may interact in order to respond with comprehensive search results. In an example embodiment, when there is a query 208 targeting private cloud 206, the query 208 may be partitioned to both internal cloud 202 and external cloud 204 in order to enable aggregation of the search results before the appropriate response to the originator of the query 208. In one or more embodiments, internal cloud 202 may be located in an enterprise datacenter, and may own the assets therein. In one or more embodiments, external cloud 204 may be located at an external service provider, and charges may be expensed accordingly. In one or more embodiments, private cloud 206 may be dedicated to an organization. In one or more embodiments, multiple "tenants" within the organization may use private cloud 206. In one or more embodiments, private cloud 206 may be in contrast to a public cloud that is shared across multiple organizations that may not even be cognizant of the mutual sharing.

In one or more embodiments, in order to enable simplicity of the aforementioned query processing, internal cloud 202 and external cloud 204 may be coupled to one another (i.e., through private cloud 206) as a federated system, as shown in FIG. 2 so that constituent elements rely on one another and have access to requisite information. In one or more embodiments, in a distributed search system (not shown in FIG. 2) in the cloud computing system 200, the resources may include a coordinator that is configured to receive and route client queries (e.g., query 208), a query processor configured to include index information, and a cache configured to store previous query search results in order to enable increased performance. In one or more embodiments, one or more VMs in the clouds may implement each of the coordinator, the query processor, and the cache. In one or more embodiments, in order to achieve increased performance, the VMs may be grouped both region-wise (e.g., geographical), and network topology-wise. In one or more embodiments, at least two kinds of the groups (e.g., region-wise, network topology-wise) may be deployed in internal cloud 202 and external cloud 204. It is obvious that there may be a number of internal clouds and external clouds interacting (e.g., through a number of private clouds) to generate search results. In one or more embodiments, the search ability may be provided as a value addition to the cloud computing system 200 partners.

In one or more embodiments, a search framework providing the searching may be scalable enough to accommodate multiple search systems placed inside both internal cloud 202 and external cloud 204. In one or more embodiments, the search framework may be able to aggregate the search results with proper filtering and ranking.

In one or more embodiments, searching in the cloud computing system 200 may yield "private" results and group-shared results. In one or more embodiments, "private" results may include search results relevant to private cloud 206, and group-shared results may include search results relevant to a group to which private cloud 206 may belong to. In one or more embodiments, the search results may provide information such as file/service/program location (e.g., host server, VM, directory) and may directly link to the appropriate VM and/or directory.

In one or more embodiments, the search results may include results from online VMs (i.e., VMs that are powered ON) and/or offline VMs (i.e., VMs that are powered OFF). In one or more embodiments, the search results may indicate as to whether the relevant data/file is associated with an online VM or an offline VM. In one or more embodiments, the search results may be obtained on a web browser, and a number of relevant virtual applications (vApps)/VMs and associated data/files may be summarized as part of the search results. In one or more embodiments, an option to power ON an offline VM and/or power OFF an online VM may be provided along with the relevant search result.

Figure 3:
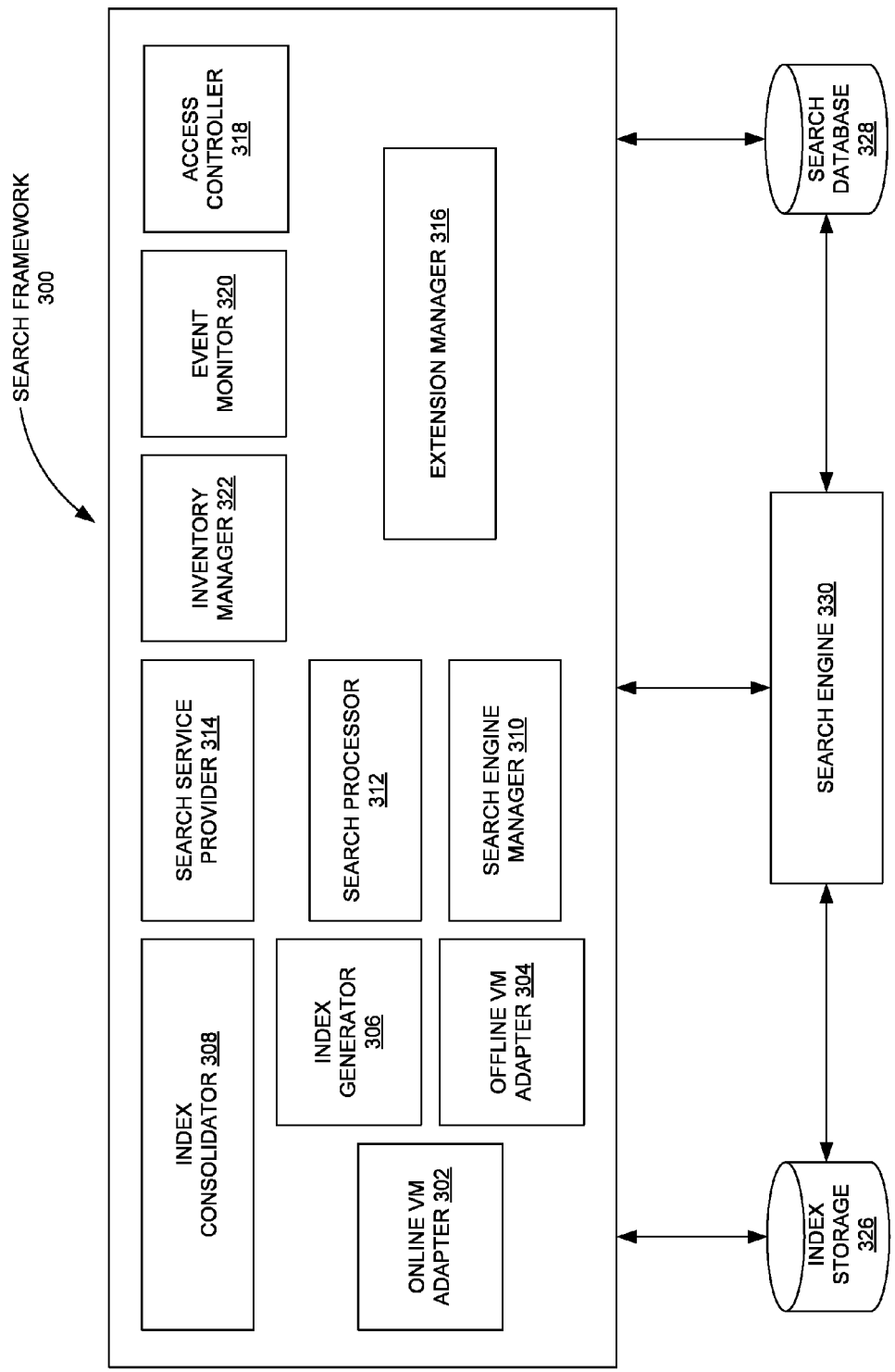
FIG. 3 is a schematic view of a search framework interfaced with a search engine, according to one or more embodiments.

FIG. 3 shows a search framework 300 interfaced with a search engine 330, according to one or more embodiments. In one or more embodiments, search framework 300 may include an online VM adapter 302 configured to communicate with an online VM (i.e., a VM that may be powered ON) agent, as will be discussed below, and to transmit index data associated with the online VM(s). An offline VM adapter 304 is used to read the file system of a VM in the powered OFF state. Since the file system of the VM is embedded in VM's virtual disk file(s), offline VM adapter 304 includes driver(s) that are aware of the specific data structure of virtual disk files. In one or more embodiments, offline VM adapter 304 may be configured to provide the ability to mount and index virtual disk image files associated with offline VMs, i.e., VMs that have been powered off. In one or more embodiments, offline VM adapter 304 may also be configured to read/write virtual disk image files offline, to be able to read files in a given snapshot (i.e., copy of files/directories as they were in a temporal past), and to maintain a partition table. In one or more embodiments, an entire host server or a desktop environment may be recreated by a virtual disk or a VM in a disk image file. In one or more embodiments, a VM disk format specification may describe and document the VM environment and may specify storage therein.

In one or more embodiments, the offline VM adapter 304 may also be configured to transmit existing index data. In one or more embodiments, search framework 300 may include an index generator 306 configured to generate index data for a given virtual disk volume. In one or more embodiments, an index consolidator 308 may consolidate all index data into the local index storage 326 interfaced with search framework 300. In one or more embodiments, therefore, the indexing tasks may include online VM index data collection, offline VM index generation, and/or index updates and consolidation. In one or more embodiments, specifically, index consolidator 308 may be configured to aggregate index files from VMs, to maintain snapshot index files, to update index data on VM events such as power state change, snapshot/revert, and/or remove/add, and to collaborate with search service provider 314 to provide searching through well-defined Application Programming Interfaces (APIs) to select the index database (e.g., current, snapshot).

In one or more embodiments, search framework 300 may also include a search engine manager 310 configured to manage third-party search engine plug-ins (e.g., static plug-in, dynamic plug-in). In one or more embodiments, search engine manager 310 may, therefore, be configured to provide the ability to utilize third-party search engines (e.g., search engine 330). In one or more embodiments, a search processor 312 included in search framework 300 may be configured to provide the ability to handle large search requests. In one or more embodiments, search service provider 314 may be configured to provide classical search services, the ability to search against a central index database (e.g., search database 328) and/or snapshot index database, the ability to aggregate distributed search results, and/or informative search results. In one or more embodiments, search service provider 314 may, therefore, be configured to receive and process search requests. In one or more embodiments, the search requests may originate through, for example, a virtualized environment (VE) client (e.g., VMWare®'s Virtual Infrastructure (VI) client), Adobe®'s Flex, and/or a built-in search web User Interface (UI).

In one or more embodiments, search framework 300 may further include an extension manager 316 configured to communicate with centralized manager 406, and to manage extensions such as libraries, configuration data files, and extension registers. The term centralized manager as used herein means a management software that provides a mechanism to configure and manage one or more hosts, virtual machines (VMs), and other components of virtualized infrastructure. For example, VMware VC™ provides either same or similar functionality. Similar management softwares are also available from vendors such as Microsoft™. In one or more embodiments, access controller 318 may be configured to provide authentication and authorization services, or, in other words, to enforce security policies. In one or more embodiments, event monitor 320 may configured to monitor and notify events such as VM power ON/OFF and live migration of VM across host servers (e.g., through VMWare®'s VMotion™ or similar products from other vendors) for purposes of appropriately synchronizing the data to be indexed. In one or more embodiments, inventory manager 322 may be configured to communicate with VMs/host servers/appropriate products to obtain inventory properties.

In one or more embodiments, search framework 300 may be utilized to search information from all VMs managed by the cloud OS. In one or more embodiments, users may be able to constrain a search scope thereof from the datacenter level to the host server level. In one or more embodiments, search requests may be expected to originate through a web UI (e.g., Adobe®'s Flex) and/or the VE client. In one or more embodiments, search framework 300 may be deployed as a VM image (e.g., Virtual Appliance (VA)) or distributed VM images in a cloud OS (e.g., VMWare®'s vSphere™) environment in order to eliminate the installation, configuration, and maintenance costs as well as load balancing. In one or more embodiments, search framework 300 may be implemented as an extension to the cloud OS to include management and performance isolation benefits. In one or more embodiments, search framework 300 may be deployed on a host server side when implemented as a VM image.

Figure 4:
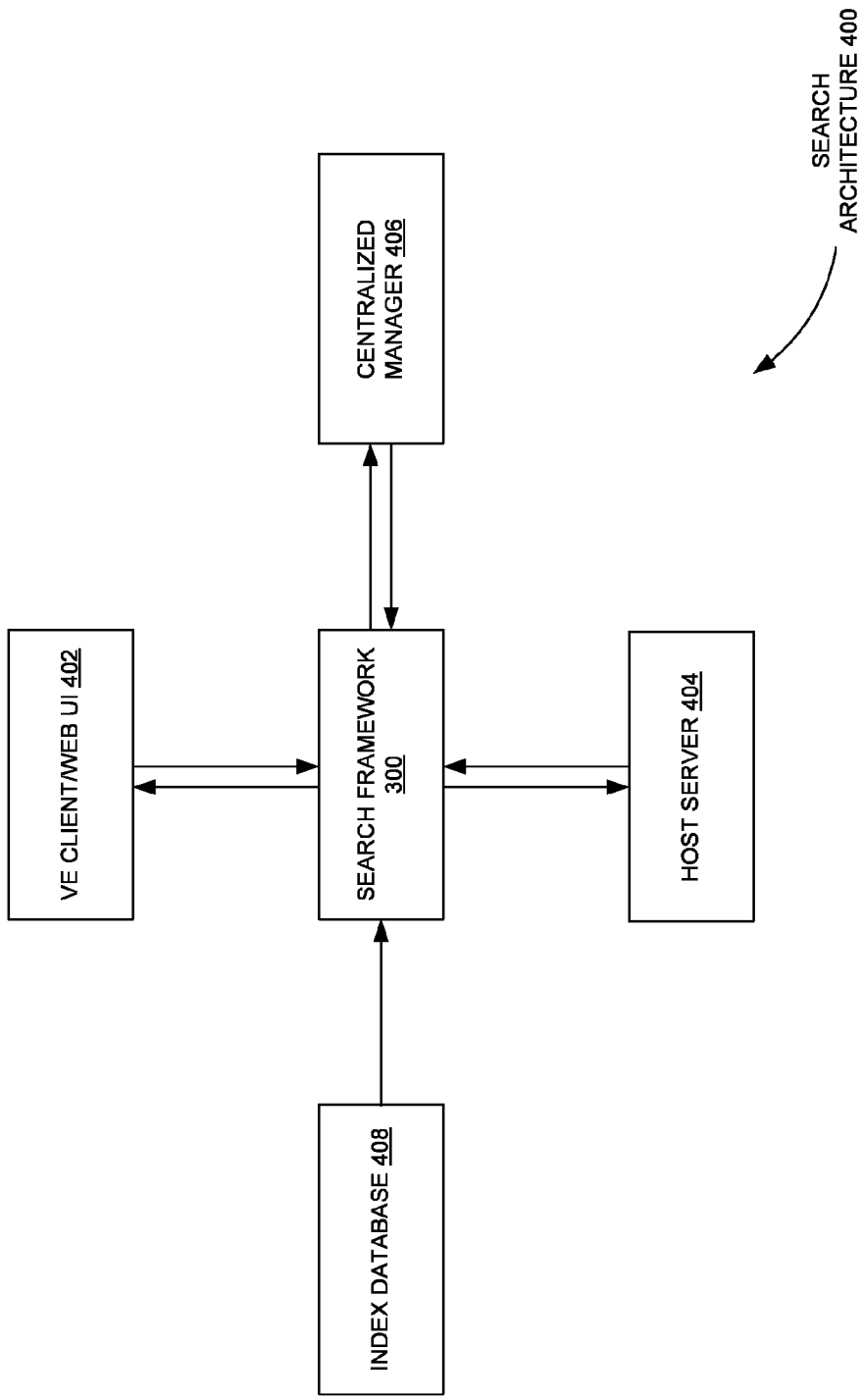
FIG. 4 is a schematic view of a search architecture including the search framework of FIG. 3, according to one or more embodiments.

FIG. 4 shows a search architecture 400 including the search framework 300 of FIG. 3, according to one or more embodiments. In one or more embodiments, VE client/web UI 402 may be the origin of the search requests, as discussed above. In one or more embodiments, search framework 300 may act as a search service provider that is configured to accept the search requests from VE client/web UI 402, and to send back the query results in an appropriate format. In one or more embodiments, search framework 300 may be responsible for collecting/consolidating, parsing, and storing index data from VMs across all managed host servers (e.g., host server 404). In one or more embodiments, centralized manager 406 may provide inventory and authentication (e.g., user authentication) services to search framework 300. In one or more embodiments, search framework 300 may be integrated with centralized manager 406 in order to leverage the capabilities of centralized manager 406 and to obtain information about VMs managed by centralized manager 406.

In one or more embodiments, search framework 300 may be configured to allow plugging-in of third party searching/indexing libraries (e.g., Apache®'s Lucene™). In one or more embodiments, search framework 300 may have an access controller 318, as discussed above, configured to interact with centralized manager 406 to provide access control ability. In one or more embodiments, search framework 300 may have an associated index database 408 configured to include indexes related to VMs.

In one example embodiment, users may log into the VE client 402 and search contents of VMs via a search bar. In another example embodiment, users may log into a web portal provided by search framework 300 and search contents of VMs directly. In one or more embodiments, search results may be presented in VE client 402 and/or a web browser. In one or more embodiments, each search result may provide information such as file/service/program location (e.g., host server, VM, directory) and may directly link to the appropriate VM and/or directory. In one or more embodiments, the search results may indicate private data and may include results from online VMs (i.e., VMs that are powered ON) and/or offline VMs (i.e., VMs that are powered OFF). In one or more embodiments, the search results may indicate as to whether the relevant data/file is associated with an online VM and/or an offline VM. In one or more embodiments, an option to power ON an offline VM and/or power OFF an online VM may be provided along with the relevant search result. In one or more embodiments, the search results may be "private" to the cloud OS. In one or more embodiments, the OS associated with a VM may also be summarized/indicated along with the relevant data/file as part of the search results.

In one or more embodiments, search information from a single host server 404 may rarely be utilized without deployment of the cloud OS, except in the case of Small/Medium Business (SMB) virtualization. Therefore, in one or more embodiments, a search service utilizing search framework 300 may not be provided based on a single host server 404. However, in one or more embodiments, components on the host server 404 may be the building blocks for the search service.

Figure 5:
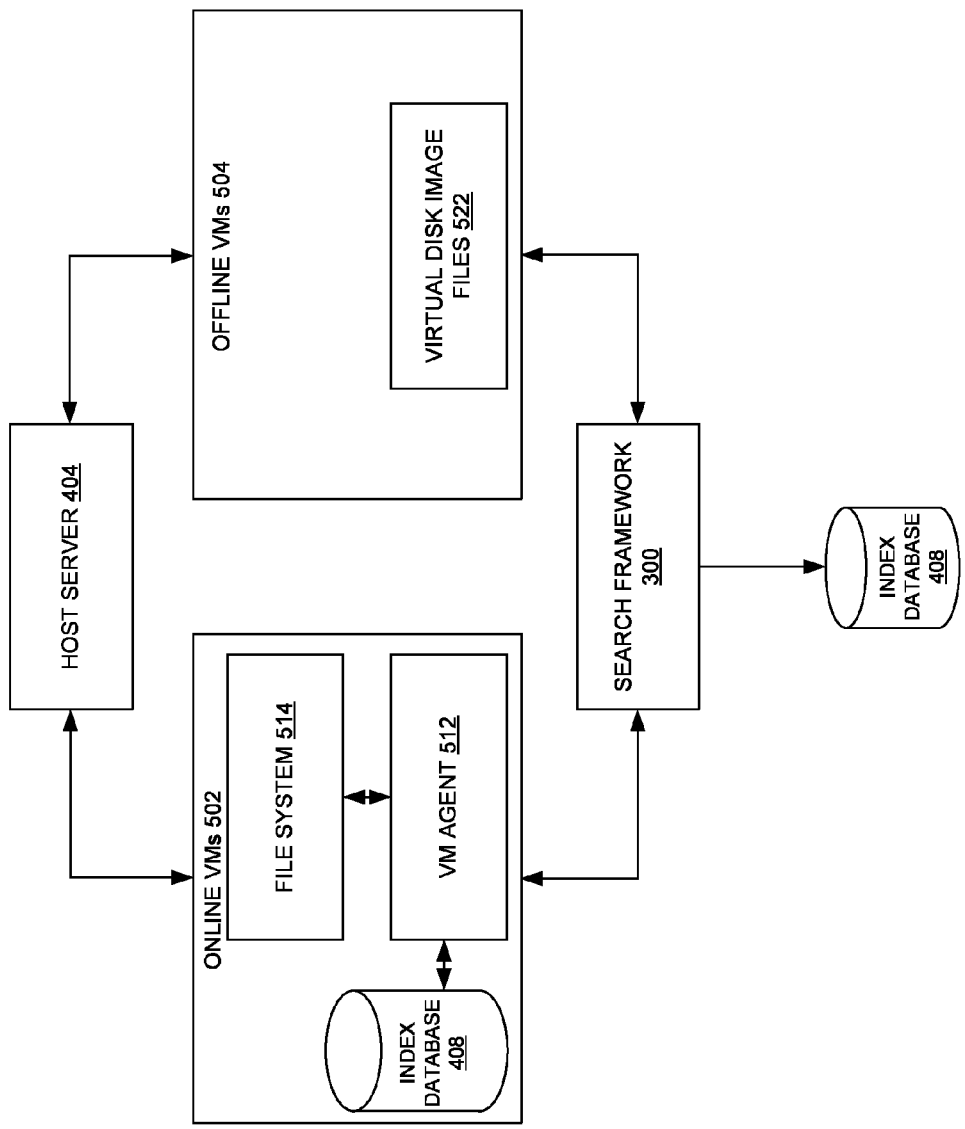
FIG. 5 is a schematic view of the search framework of FIG. 3 interacting with online virtual machines (VMs) and offline VMs of a host server, according to one or more embodiments.

In one or more embodiments, in a cloud OS environment, there may be two kinds of storage deployment, viz., shared storages in, for example, mid-/large-enterprise Information Technology (IT) environments, and local storage in, for example, SMB environments. FIG. 5 shows search framework 300 interacting with online VMs 502 and offline VMs 504 of host server 404, according to one or more embodiments. In one or more embodiments, in order to obtain data on online VMs 502, an OS-specific VM agent 512 may be installed thereof. In one or more embodiments, VM agent 512 may be configured to monitor file changes in the local file system 514, collect, parse, and store index data on the local VM 502, leverage third-party desktop search engines to perform the indexing, transmit to and update the index data at search framework 300, and/or enforce security policies. In one or more embodiments, the security policies may be configurable by both local VM owners and the cloud OS administrators.

In one or more embodiments, more specifically, VM agent 512 may be configured to generate the index or incremental index files, to monitor online VMs 502 for file/service/program changes, to communicate with and transmit data to search framework 300, to configure the index attribute, and to leverage third-party search engines as discussed above.

In one or more embodiments, in order to gather data on offline VMs 504, search framework 300 may be configured to mount the virtual disk image files 522 associated with offline VMs 504 to a file system thereof, and to perform the appropriate indexing (e.g., through offline VM adapter 304, index generator 306, index consolidator 308). In one or more embodiments, therefore, search framework 300 may be responsible for mounting virtual disk image files 522 of offline VMs 504, and collecting, parsing, and storing the index data to a local database thereof (e.g., index database 408). In one or more embodiments, search framework 300 may also be responsible for enforcing security policies that are configurable by both offline VM 504 owners and the cloud OS administrators.

In one or more embodiments, a VM suite (e.g., VMWare®'s Workstation™ and similar products from other vendors) may be configured to allow multiple VMs to execute simultaneously a host of OSs (e.g., Windows®, Linux™). In one or more embodiments, at the VM suite level, VM suite users may own all of the aforementioned VMs, and may be interested in contents of VMs such as documents, services, applications, and, particularly, snapshots. In one or more embodiments, users may be able to search, view, compare, and even edit historical files across different snapshots through the search architecture described below.

Figure 6:
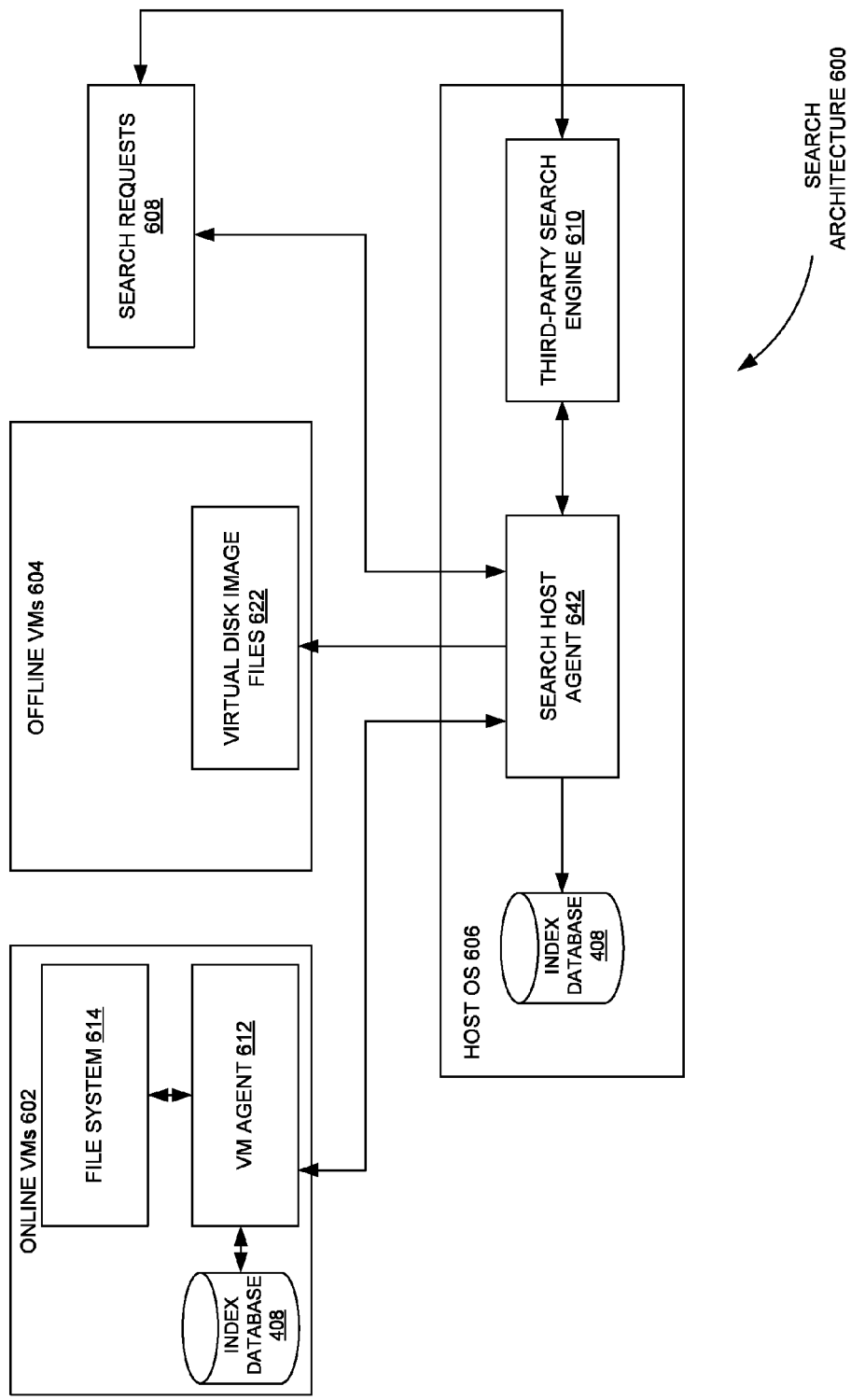
FIG. 6 is a schematic view of a search architecture at the VM suite level, according to one or more embodiments.

FIG. 6 shows a search architecture 600 at the VM suite level, according to one or more embodiments. In one or more embodiments, search architecture 600 may include a host OS 606, which, in turn, may include a search host agent 642 instead of search framework 300 discussed above. In one or more embodiments, the functionality of search host agent 642 may be similar to that of search framework 300. In one or more embodiments, search host agent 642 may exist as a service rather than as a VM. In one or more embodiments, the VM suite (not shown) may be interfaced with search host agent 642, online VMs 602, and offline VMs 604, and may include a VM manager (not shown). In one or more embodiments, the VM manager may be configured to provide VM static information and snapshot information to search host agent 642, to store VM user name/password, and to notify VM events such as power state changing and snapshot operations (e.g., add, remove, alert).

In one or more embodiments, in search architecture 600, search requests 608 may go through to third-party search engines 610 (e.g., Google® Desktop Search™, Microsoft®'s Windows Desktop Search™, Apple®'s Spotlight™), which may communicate with search host agent 642 to obtain the search results to be displayed. In one or more embodiments, search architecture 600, again, shows online VMs 602 and offline VMs 604 interfaced with the host OS 606. In one or more embodiments, in order to obtain data on online VMs 602, a VM agent 612 may be installed thereof. In one or more embodiments, VM agent 612 may be configured to monitor file changes in the local file system 614, to collect, parse, and store index data on the local VM 602, to leverage third-party desktop search engines 610 to perform the indexing, to transmit to and update the index data at search host agent 642, and/or to enforce security policies.

In one or more embodiments, in order to gather data on offline VMs 604, search host agent 642 may be configured to mount the virtual disk image files 622 associated with offline VMs 604 to a file system thereof, and to perform the appropriate indexing. In one or more embodiments, therefore, search host agent 642 may be responsible for mounting virtual disk image files 622 of offline VMs 604, and collecting, parsing, and storage the index data to a local database thereof (e.g., index database 408). In one or more embodiments, search host agent 642 may also be responsible for enforcing security policies.

Figure 7:
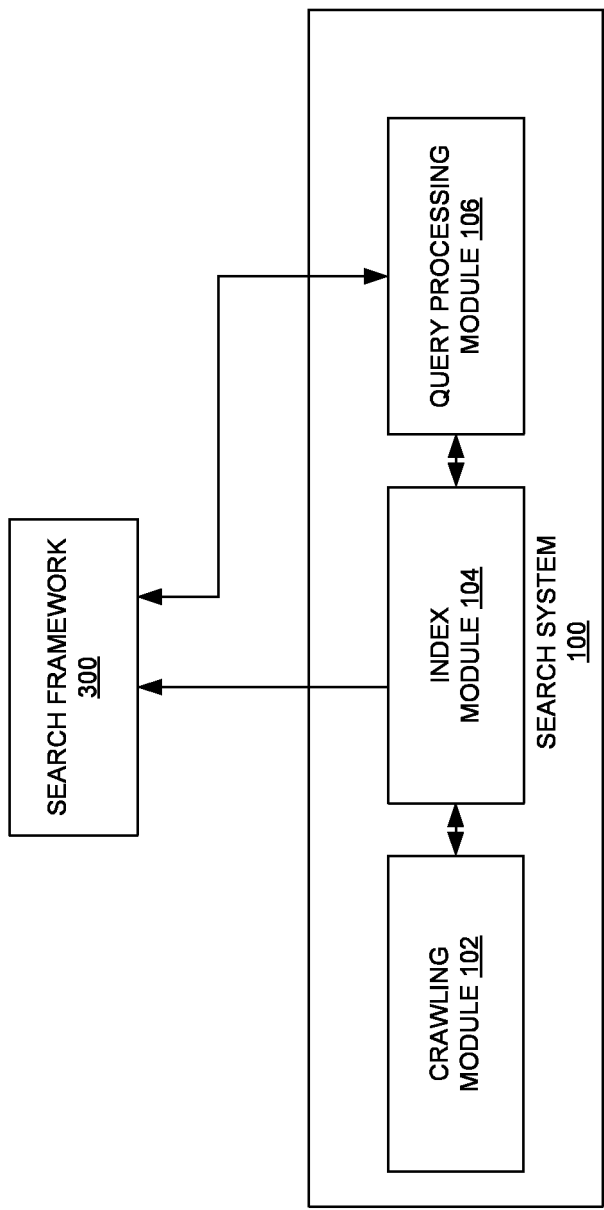
FIG. 7 is a schematic view of the search framework of FIG. 3 interfaced with the search system of FIG. 1, according to one or more embodiments.

In one or more embodiments, a set of appropriate interfaces may be defined for the searching described above to allow for third-party search engine 610 vendors (e.g., Google®) to provide a set of corresponding APIs to integrate with search framework 300 (or search host agent 642). In one or more embodiments, this may enhance the extensibility of the searching. In one or more embodiments, search framework 300 may be interfaced with search system 100 of FIG. 1, as shown in FIG. 7. In one or more embodiments, search framework 300 may provide the search service through a set of well-defined and unified APIs. In one or more embodiments, an enterprise management tool may utilize search framework 300 as an information search engine.

In one or more embodiments, utilizing search architecture 600 at the VM suite level may yield search results that provide information such as file/service/program location (e.g., VM, directory). In one or more embodiments, the search results may directly link to the appropriate VM and/or directory. In one or more embodiments, the search results may include results from online VMs 602 (i.e., VMs that are powered ON) and/or offline VMs 604 (i.e., VMs that are powered OFF). In one or more embodiments, the search results may indicate as to whether the relevant data/file is associated with an online VM 602 and/or an offline VM 604. In one or more embodiments, the relevant OS executed on an online VM 602/offline VM 604 may also be indicated in the search results. Again, in one or more embodiments, an option to power ON an offline VM 604 and/or power OFF an online VM 602 may be provided along with the relevant search result.

Figure 8:
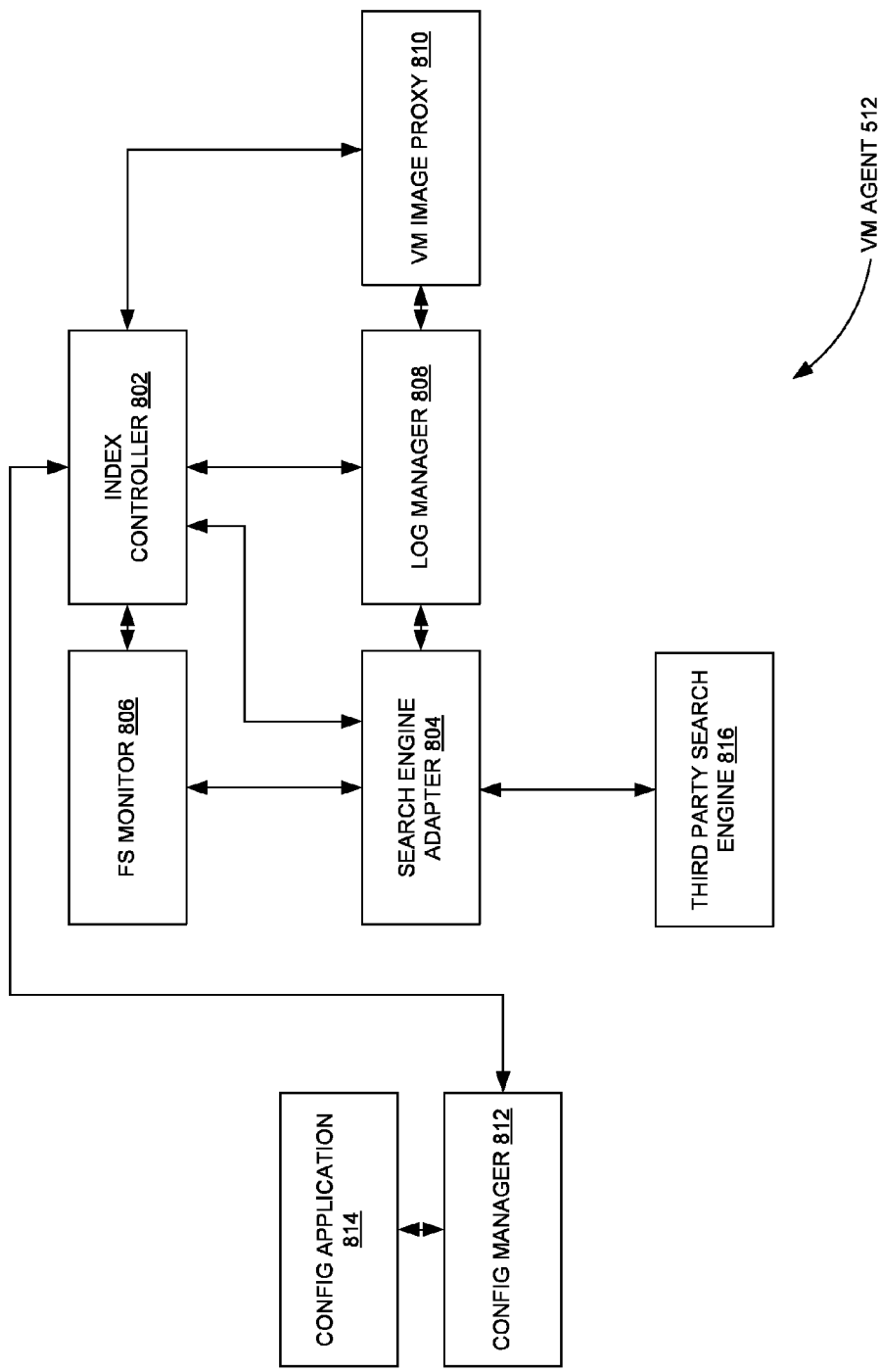
FIG. 8 is a schematic view of a VM agent framework, according to one or more embodiments.

FIG. 8 shows a VM agent 512 framework, according to one or more embodiments. In one or more embodiments, the VM agent 512 framework includes an index controller 802 configured to control the communication between the search engine adapter 804, File System (FS) monitor 806, Log Manager 808, and VM image proxy 810. In one or more embodiments, search engine adapter 804 may be configured to manage third-party search engine 816, and to provide a uniform interface to index controller 802. In one or more embodiments, Log Manager 808 may be configured to record the log information, and to provide information about system integrity to index controller 802. In one or more embodiments, third-party search engine 816 may be a set of search related APIs that are provided by third-parties (e.g., Google®, Apache®'s Lucene™).

In one or more embodiments, FS monitor 806 may inform index controller 802 to take requisite action when some files or directories are changed in file system 614. In one or more embodiments, VM image proxy 810 may be configured to receive a requisite command from index controller 802, and to transmit index information to search framework 300 (or search host agent 642). In one or more embodiments, config manager 812 may configure the index attributes, and config application 814 may be used by the end user to configure a file/directory attribute.

Figure 9:
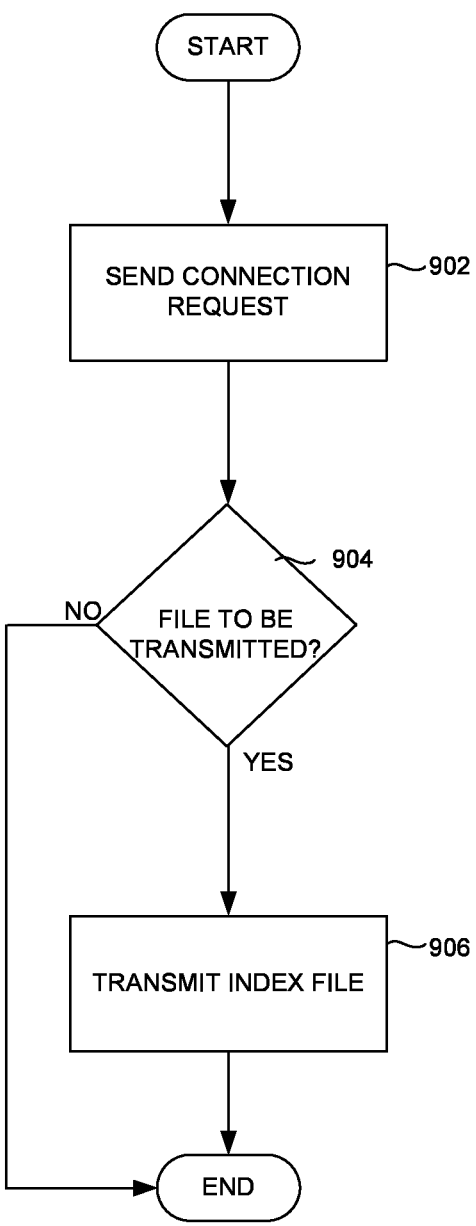
FIG. 9 is a flowchart detailing the interaction between VMs and the search framework of FIG. 3 (or search host agent of FIG. 6), according to one or more embodiments.

FIG. 9 shows a flowchart detailing the interaction between VMs and search framework 300 (or search host agent 642), according to one or more embodiments. In one or more embodiments, operation 902 may involve search framework 300 (or search host agent 642) sending a connection request to a VM. In one or more embodiments, search framework 300 (or search host agent 642) may receive a reply from the VM. In one or more embodiments, operation 904 may involve search framework 300 (or search host agent 642) querying as to whether any file is to be transmitted. In one or more embodiments, if there is no file to be transmitted, search framework 300 (or search host agent 642) may receive a reply from VM that there is no transmission and terminate the connection.

In one or more embodiments, if there is a file to be transmitted, VM may send an appropriate reply to search framework 300 (or search host agent 642). At the same time, in one or more embodiments, VM may transmit the operation (e.g., add, modify, delete) kind and the index file meta information. In one or more embodiments, the VM may then transmit the index file to search framework 300 (or search host agent 642) in operation 906. In one or more embodiments, VM may also transmit a message to search framework 300 (or search host agent 642) indicating that there is no more transmission, which may then be acknowledged by search framework 300 (or search host agent 642). In one or more embodiments, search framework 300 (or search host agent 642) may then terminate the connection.

FIG. 10 shows a table of search request parameters 1002, according to one or more embodiments. In one or more embodiments, the search request parameters 1002 may include a session ID, which is used for user authentication. In one or more embodiments, the session ID may be of the "string" (i.e., a sequence of characters) type 1004. In one or more embodiments, the query, i.e., a group of keywords used for the search purpose, may again be of the "string" type 1004. In one or more embodiments, the start index of the desired result (shown as "start") may be of the "integer" type 1004. In one or more embodiments, the number of results desired per query (shown as "maxResults") may be of the "integer" type 1004. In one or more embodiments, the type of the search target such as file/service/application (shown as "type") may be of the "integer" type 1004. In one or more embodiments, the scope indicating where to search (shown as "location") may be of the "string" type 1004.

FIG. 11 shows a table of result structure parameters 1102, according to one or more embodiments. In one or more embodiments, the result structure parameters 1102 may include the total number of results that exist for a query (shown as "totalResultsCount"), which is of the "integer" type 1104. In one or more embodiments, the actual list of search results (shown as "resultElements") may be an array of items. Therefore, in one or more embodiments, "resultElements" may be of the "array" type 1104. In one or more embodiments, the index of the first search result in the aforementioned array of items (shown as "startIndex") may be of the "integer" type 1104. In one or more embodiments, the index of the last search result in the array of items (shown as "endIndex") may be, again, of the "integer" type 1104.

FIG. 12 shows a table of result entry structure parameters 1202, according to one or more embodiments. In one or more embodiments, the name of a specific result element (e.g., name of any result type supported including file, service, and application) is indicated in FIG. 12 as "name." In one or more embodiments, "name" may be of the "string" type 1204. In one or more embodiments, the type of the search target such as file, service, and application (shown as "type") may be of the "integer" type 1204. In one or more embodiments, the location of the result (shown as "path") may be of the "string" type 1204. In one or more embodiments, a text excerpt from the result (shown as "snippet") that shows the query in context during the appearance thereof in the matching file may be of the "string" type 1204. In one or more embodiments, the last modified time (shown as "lastModifiedTime") may be of the "DateTime" type 1204.

FIG. 13 shows a table of extensible query syntax and examples, according to one or more embodiments. In one or more embodiments, the table includes a query capability 1302 and an example query 1304, which serves as an example of the query capability 1302. In one or more embodiments, in order to search for all terms included as keywords, irrespective of the term order, the "default search" may be employed. In one or more embodiments, the term order may affect the search results. As an example, when word A and word B are included as search terms in a "default search" (shown as A B), the search results may include both word A and word B. In one or more embodiments, in order to include a word in the search, the "include search" may be employed. As an example, when word A and word B are utilized in the "include search" as A+B, word B may always be included in the search result associated with word A. Although this may seem to be similar to the "default search," the "include search" may allow for link words (e.g., a, an, the, of, or, and) that may be ignored by the "default search" to be searched for. For example, if word "server" and word "workstation" are utilized in the "include search" as server+the workstation, the search results may include "the workstation," along with occurrences of "server."

In one or more embodiments, in order to exclude a word from the search, the "exclude search" may be utilized. As an example, when word A and word B are utilized in the "exclude search" as A−B, the search results include all occurrences of A where B is excluded. In one or more embodiments, in order to search for complete phrases, the "phrase search" may be used. As an example, when the words "host" and "server" are utilized as "host server" in the "phrase search," the entire phrase "host server" may be searched for. In one or more embodiments, in order to include either word A or word B, a "Boolean OR search" may be used. As an example, when word A and word B are utilized as A OR B in the "Boolean OR search," world A or word B is included in the search result. In one or more embodiments, in order to limit a query to a certain location, a "Location Restrict" may be used. As an example, "Location Restrict" may be utilized in the location:[DataCenter][Host Server][VM] format, where DataCenter, Host Server, and VM are shown merely for purposes of illustration.

In one or more embodiments, in order to search in the body text alone and ignore title matches, a "Content Search" may be used. As an example, "Content Search" may be utilized in the content:cloud OS format, where cloud OS is shown merely for purposes of illustration. In one or more embodiments, in order to search the title alone and ignore content matches, a "Title Search" may be used. As an example, "Title Search" may be utilized in the title:cloud OS format, where cloud OS, again, is shown merely for purposes of illustration. It is obvious that other search parameters may be employed and the abovementioned parameters may be combined in a logical form (e.g., combining logical operators) to effect a search, and such modifications are within the scope of the exemplary embodiments.

In one or more embodiments, search framework 300 (or search host agent 642) may allow indexing of VM data, which dispenses with the need to power ON an offline VM (504, 604) to search data inside the VM. Also, in one or more embodiments, search framework 300 (or search host agent 642) may allow for more data to be searched in a cloud computing environment. In one or more embodiments, the search capabilities may be extended to metadata within a datacenter and/or metadata in the VE client 402, which may be provided by the inventory database. In one or more embodiments, more "intelligence" may be provided on the metadata in order for the search engine to yield more relevant search results to users of the VE. In one or more embodiments, VMs may not be isolated in the VE due to search architectures described above. In one or more embodiments, indexes may be updated through communication with search framework 300, without a need for network communication.

Figure 14:
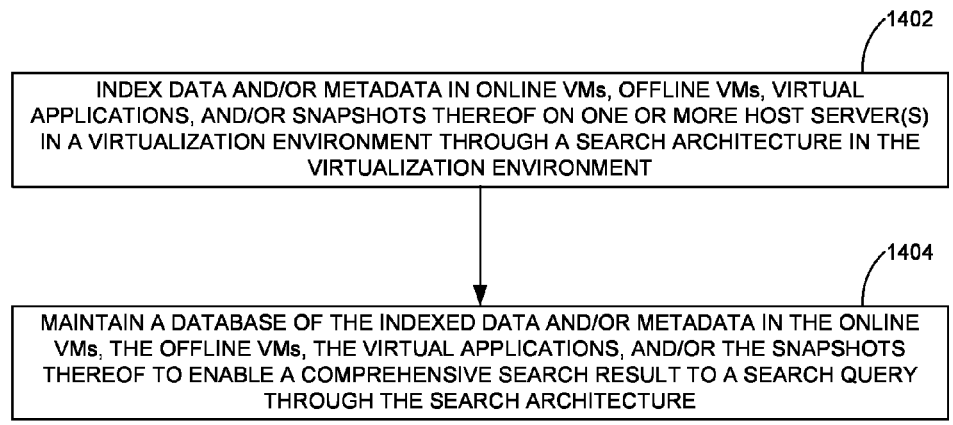
FIG. 14 is a process flow diagram detailing the operations involved in a method of comprehensive searching in a virtualization environment, according to one or more embodiments.

FIG. 14 shows a process flow diagram detailing the operations involved in a method of comprehensive searching in a virtualization environment, according to one or more embodiments. In one or more embodiments, operation 1402 may involve indexing data and/or metadata in online VMs, offline VMs, virtual applications and/or snapshots thereof on one or more host server(s) in a virtualization environment through a search architecture in the virtualization environment. In one or more embodiments, online VMs may be VMs that are powered on, and offline VMs may be VMs that are powered off.

In one or more embodiments, operation 1404 may involve maintaining a database of the indexed data and/or metadata in the online VMs, offline VMs, virtual applications, and/or snapshots thereof to enable a comprehensive search result to a search query through the search architecture. In one or more embodiments, the database may be associated with the search architecture.

Figure 15:
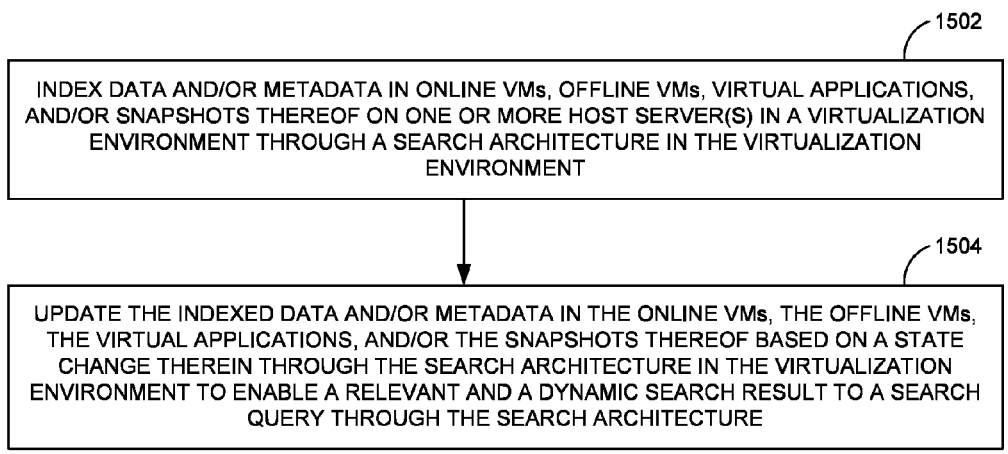
FIG. 15 is a process flow diagram detailing the operations involved in a method of updating an index database to enable relevant and dynamic searching in a virtualization environment, according to one or more embodiments.

FIG. 15 shows a process flow diagram detailing the operations involved in a method of updating an index database to enable relevant and dynamic searching in a virtualization environment, according to one or more embodiments. In one or more embodiments, operation 1502 may involve indexing data and/or metadata in online VMs, offline VMs, virtual applications and/or snapshots thereof on one or more host server(s) in a virtualization environment through a search architecture in the virtualization environment. In one or more embodiments, online VMs may be VMs that are powered on, and offline VMs may be VMs that are powered off.

In one or more embodiments, operation 1504 may involve updating the indexed data and/or metadata in the online VMs, the offline VMs, the virtual applications, and/or the snapshots thereof based on a state change therein through the search architecture in the virtualization environment to enable a relevant and a dynamic search result to a search query through the search architecture.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer device), and may be performed in any order (e.g., including using means for achieving the various operations). Accordingly, the specification and drawings are to be regarded in an illustrative rather than a restrictive sense.

What is claimed is:

1. A method for maintaining a search capability offered by a search system in a virtualization environment, the method comprising:

receiving, by the search system, first index data from an agent running in a currently running VM, wherein the agent is configured to generate the first index data wherein first index data corresponds to files stored on a file system used by the currently running VM;

determining, by the search system, an event for the currently running VM that indicates a change in state for the currently running VM to an offline VM, the offline VM being a VM that is not currently running;

when the event is determined by the search system, using an offline VM adapter to generate second index data, wherein using the offline VM adapter comprises:

mounting, by the offline VM adapter in the search system, a virtual disk image file associated with the offline VM to access file systems stored in the virtual disk image file; and generating the second index data wherein second index data corresponds to the file systems stored in the virtual disk image file; and maintaining, by the search system, a database of the first index data received from the agent and the second index data generated by offline VM adapter in the search system from the file systems stored in the virtual disk image files to enable a search result in response to a search query received by the search system.

2. The method of claim 1, further comprises
consolidating the first index data and the second index data in the database of the search system.

3. The method of claim 1, further comprising at least one of:
utilizing a third-party search engine to generate the search result; and
leveraging the third-party search engine to index at least one of data and metadata of the currently running VM and the offline VM.

4. The method of claim 1, further comprising
transmitting the search query through at least one of a virtualization environment client and a user interface provided therein.

5. The method of claim 1, further comprising
enforcing a security policy to enable authentication and authorization services through the search system.

6. The method of claim 1, further comprising
deploying the search system as a VM image in a cloud operating system environment.

7. The method of claim 1, further comprising
communicating with at least one host server, the currently running VM, and the offline VM in the virtualization environment to obtain an inventory property thereof.

8. The method of claim 1, further comprising
providing information about an operating system associated with one of the currently running VM and the offline VM in the search result.

9. The method of claim 1, wherein the virtualization environment includes an internal cloud located in an enterprise datacenter and an external cloud located at an external service provider, the internal cloud and the external cloud being configured to communicate with one another through the search system to generate the search result.

10. The method of claim 1, wherein the change in state of the currently running VM and the offline VM includes at least one of
a powering on of the offline VM,
a powering off of the currently running VMs,
a migration of the currently running VM from a host server in the virtualization environment to another host server in the virtualization environment,
a file change in one of the currently running VM and the offline VM,
a service change in the virtualization environment, and
a program change in one of the currently running VM and the offline VM.

11. The method of claim 3, wherein utilizing the third-party search engine to generate the search result includes
utilizing a set of search related Application Programming Interfaces (APIs) associated with the third-party search engine.

12. The method of claim 4, further comprising
presenting the search result in at least one of the virtualization environment client and a web browser.

13. The method of claim 4, further comprising at least one of
powering on the offline VM and powering off the currently running VM through an interface provided through the search result.

14. The method of claim 6, further comprising
implementing the search system as an extension to the cloud operating system.

15. The method of claim 9, further comprising
grouping the currently running VM and the offline VM in at least one of the internal cloud and the external cloud based on at least one of a geographical region and a network topology.

16. A method for maintaining a search capability offered by a search system in a virtualization environment, the method comprising:
receiving, by the search system, first index data from an agent running in a currently running VM, wherein the agent is configured to generate the first index data wherein the first index data corresponds to files stored on a file system used by the currently running VM;
determining, by the search system, an event for the currently running VM that indicates a change in state for the currently running VM to an offline VM, the offline VM being a VM that is not currently running;
when the event is determined by the search system, using an offline VM adapter to generate second index data, wherein using the offline VM adapter comprises:
mounting, by the offline VM adapter in the search system, a virtual disk image file associated with the offline VM to access file systems stored in the virtual disk image file; and
generating the second index data wherein the second index data corresponds to the file systems stored in the virtual disk image file; and
updating the first index data received from the agent and the second index data generated by offline VM adapter based on the change in state for the currently running VM and the offline VM through the search system in the virtualization environment to enable a search result in response to a search query received by the search system.

17. The method of claim 16, wherein the change in state includes at least one of
a powering on of the offline VM,
a powering off of the currently running VM,
a migration of the currently running VM from a host server in the virtualization environment to another host server in the virtualization environment,
a file change in one of the currently running VM and the offline VM,
a service change in the virtualization environment, and
a program change in one of the currently running VM and the offline VM.

18. The method of claim 16, further comprising
utilizing a set of search related APIs associated with a third-party search engine to generate the search result.

19. A system for searching in a virtualization environment, comprising:
at least one host server comprising a currently running VM; and
a search architecture implemented by a processor and configured to
receive first index data from an agent running in the currently running VM, wherein the agent is configured to generate the first index data wherein the first index data corresponds to files stored on a file system used by the currently running VM;
determine an event for the currently running VM that indicates a change in state for the currently running VM to an offline VM, the offline VM being a VM that is not currently running;
when the event is determined, by the search system, using an offline VM adapter to generate second index data, wherein using the offline VM adapter comprises:
mount, by the offline VM adapter in the search system, a virtual disk image file associated with the offline VM to access file systems stored in the virtual disk image file; and generate the second index data wherein the second index data correspond to the file systems stored in the virtual disk image file; and maintain a database of the first index data received from the agent and the second index data generated by the offline VM adapter from the file systems stored in the virtual disk image file to enable a search result in response to a search query received by the search architecture.

20. The system of claim 19, wherein the search architecture comprises an online VM adapter configured to communicate with the VM agent to collect the first index data, wherein the offline VM adapter, having at least one driver with knowledge of data structure of the virtual disk image file associated with the offline VM, is configured to access the virtual disk image file offline to generate the second index data.

21. The system of claim 19, wherein the search architecture comprises a search host agent operating in a host operating system (OS) configured to communicate with the VM agent to collect the first index data, and mount the virtual disk image file associated with the offline VM to generate the second index data.

* * * * *